United States Patent
Jardak et al.

(10) Patent No.: US 10,324,193 B2
(45) Date of Patent: Jun. 18, 2019

(54) DEVICE FOR TRACKING A SATELLITE RADIONAVIGATION SIGNAL IN A MULTIPATH ENVIRONMENT

(71) Applicants: CENTRE NATIONAL D'ETUDES SPATIALES, Paris (FR); M3 SYSTEMS, L'Union (FR)

(72) Inventors: Nabil Jardak, Muret (FR); Willy Vigneau, Muret (FR); François-Xavier Marmet, Muret (FR); Lionel Ries, Viviers les Montagnes (FR)

(73) Assignees: CENTRE NATIONAL D'ETUDES SPATIALES, Paris (FR); M3 SYSTEMS, L'Union (FR)

( * ) Notice: Subject to any disclaimer, the term of this patent is extended or adjusted under 35 U.S.C. 154(b) by 335 days.

(21) Appl. No.: 15/191,825

(22) Filed: Jun. 24, 2016

(65) Prior Publication Data
US 2016/0377727 A1 Dec. 29, 2016

(30) Foreign Application Priority Data
Jun. 24, 2015 (EP) .................... 15305977

(51) Int. Cl.
*G01S 19/22* (2010.01)
*G01S 19/30* (2010.01)
(Continued)

(52) U.S. Cl.
CPC .............. *G01S 19/22* (2013.01); *G01S 19/29* (2013.01); *G01S 19/30* (2013.01); *G01S 19/44* (2013.01)

(58) Field of Classification Search
CPC ...................................... G01S 19/22
See application file for complete search history.

(56) References Cited

U.S. PATENT DOCUMENTS 6,658,048 B1 * 12/2003 Valio ...................... G01S 19/22
342/357.52
7,916,771 B2 * 3/2011 Julien .................... G01S 19/30
342/357.22
(Continued)

FOREIGN PATENT DOCUMENTS

EP 2049914 B1 12/2010
EP 2382484 A1 10/2014
(Continued)

OTHER PUBLICATIONS

European Search Report for 15305977.9, dated Dec. 11, 2015.
A. De Latour et al., "New BPSK, BOC and MBOC Tracking Structure", ION 2009 International Technical Meeting, Jan. 28, 2009, pp. 396-405, Anaheim, CA.
(Continued)

*Primary Examiner* — Gregory C. Issing
(74) *Attorney, Agent, or Firm* — Meagher Emanuel Laks Goldberg & Liao, LLP

(57) ABSTRACT

A GNSS receiver comprising a circuit configured to receive a positioning signal comprising a carrier modulated by a subcarrier and a PRN code; a subcarrier and code tracking loop, comprising a first discrimination circuit, configured to calculate a first pseudo range from said received positioning signal and a first reference signal; a code tracking loop, comprising a second discrimination circuit, configured to calculate a second pseudo range from said received positioning signal and a second reference signal; and a calculation circuit configured to evaluate a difference between said first pseudo range and said second pseudo range, and to modify the output of the first discrimination circuit accordingly.
The invention further addresses a method for calculating a pseudo-range in such a GNSS receiver.

10 Claims, 10 Drawing Sheets

(51) Int. Cl.
*G01S 19/29* (2010.01)
*G01S 19/44* (2010.01)

(56) References Cited

U.S. PATENT DOCUMENTS

| | | | |
|---|---|---|---|
| 8,964,813 B2 | 2/2015 | Hodgart et al. | |
| 9,172,524 B2* | 10/2015 | Yoon | G01S 19/30 |
| 2003/0231580 A1* | 12/2003 | Martin | G01S 19/02 |
| | | | 370/203 |
| 2010/0104046 A1* | 4/2010 | Hodgart | G01S 19/29 |
| | | | 375/340 |

FOREIGN PATENT DOCUMENTS

| | | | | |
|---|---|---|---|---|
| FR | 2941535 A1 | 7/2010 | | |
| WO | WO-2010084189 A1 * | 7/2010 | | G01S 19/30 |

OTHER PUBLICATIONS

Artaud, et al., "Development pf a Flexible Real Time GNSS Software Receiver" Satellite Navigation Technologies and European Workshop on GNSS Signals and Signal Processing (NAVITEC), 2010 5th ESA Workshop ON, IEEE Dec. 8, 2010, pp. 1-8.

Heiries, et al., "Analysis of Non Ambiguous BOC Signal Acquisition Performance", Proceedings of the 17th International Technical Meeting of the Satellite Division of the Institute of Navigation (ION GNSS 2004), The Institute of Navigation, 8511 Rixlew Lane Suite 360 Manassa, VA 20109, USA, Sep. 24, 2004, pp. 2611-2622.

English translation of CN Office Action issued in corresponding CN application No. 201610473358.5, dated Jun. 1, 2018.

J. Wendel et al. "A Robust Technique for Unambiguous BOC Tracking", Journal of The Institute of Navigation, vol. 61, No. 3, 2014.

* cited by examiner

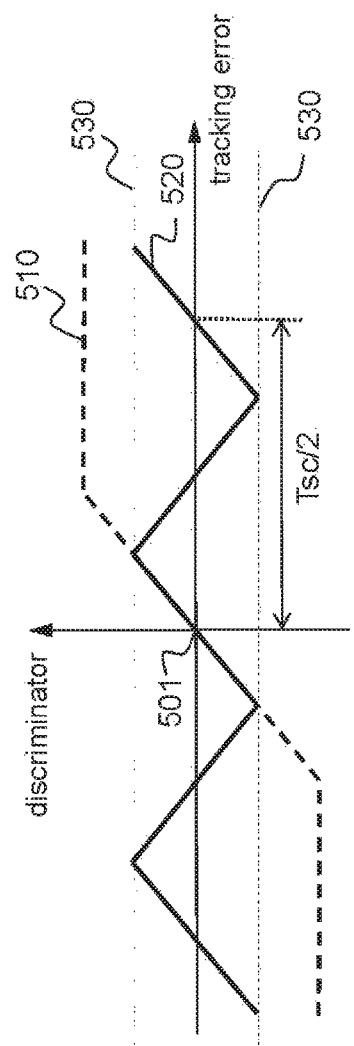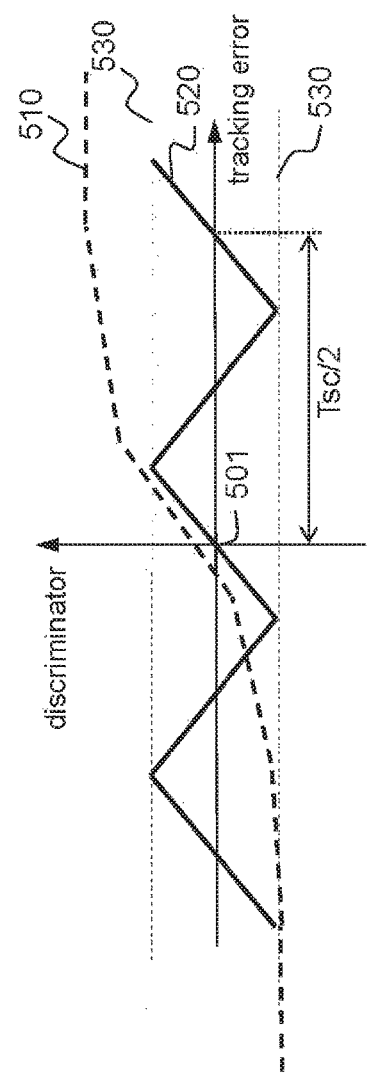

DEVICE FOR TRACKING A SATELLITE RADIONAVIGATION SIGNAL IN A MULTIPATH ENVIRONMENT

FIELD OF THE INVENTION

The present invention applies to the field of satellite navigation. More specifically, the invention allows a satellite navigation receiver to acquire and track signals with multiple intercorrelation peaks in a multipath propagation environment.

BACKGROUND PRIOR ART

There are two Global Navigation Satellite Systems (GNSS) which have been fully deployed for a number of years (the US Global Positioning System, the Russian GLONASS) and two more which are under deployment (the Chinese Beidou Navigation Satellite System and the European Galileo system). These systems rely on the same principles: microwave radio signals are broadcast from a number of satellites which orbit in a non-geostationary orbit; the signals carry a PRN code which is correlated with a local replica in a receiver configured to receive the broadcast signals; when a receiver is capable of acquiring and tracking signals from a satellite, its processing capabilities demodulate the code signal by using the correlation process and calculate a pseudo-range, which is the distance between the receiver and the satellite (affected by various error sources). This pseudo-range is taken in combination with pseudo-ranges acquired from other satellites (generally three) to determine a position, velocity and time (PVT) solution.

Radio navigation signals transmitted by some satellites are known as BOC signals (Binary Offset Carrier modulation), where a carrier wave is first modulated by a PRN code, and then by a subcarrier. The resulting signal has a spectrum having two main lobes located on either side of the carrier frequency, thus allowing cohabitation with other signals using the same carrier frequency. BOC signals are referred to as BOC (m, n), where the chip rate of the code signal is n*1.023 Mcps (Mega Chips per second), and the subcarrier frequency is m*1.023 MHz.

The tracking of BOC signals has proven to offer more precise and robust positioning information than PSK signals, mainly thanks to the sharper slope of its autocorrelation function peak, and its bandwidth. However, unlike PSK signals, the autocorrelation function of a BOC signal shows several side peaks which compete with the main peak, some of the side peaks having magnitudes close to the main peak magnitude.

The correlation of the received BOC signal with a reference signal is used to construct a discriminator value for controlling a Phase Locked Loop (PLL) of the receiver and tracking the positioning signal. A PVT is then constructed using the phase of the PLL, and a received navigation message.

When error sources, such as noise or interferers, affect the received signal, the PLL might lock its tracking position on one of the side peaks of the correlation between the received signal and a reference signal, which leads to the introduction of a bias in the position measurements. This bias can range from ~9.7 meters for a BOC (15, 2.5) signal, to ~146.5 m for a BOC (1,1) signal. BOC signal receivers must deal with this issue to ensure a precise positioning.

Positioning signals are also affected by multipath, due to reflections on the environment occurring during the signal propagation. These multipath reflections are particularly present when operating in an urban or indoor environment. The reception of multipath signals creates artifacts in the correlation function between the received signal and the reference signal, multipath peaks being shifted from the original peaks by a distance corresponding to the delay between the main path and the multipath.

A number of state of the art techniques are dealing with the issue of synchronizing the tracking on the main peak of a BOC signal, but these techniques do not sufficiently consider propagation in a multipath environment.

Among these techniques, the Bump-Jumping technique, described in U.S. Pat. No. 8,964,813, is based on performing two additional correlations with a delayed version of a reference signal, a Very-Early (VE) correlation and a Very-Late (VL) correlation, and detecting tracking on side peaks of the BOC signal by comparing the energy of the Prompt, Very-Early and Very-Late signals. When the Prompt correlation is detected as not having the highest amplitude, a phase jump is operated in the direction corresponding to the highest correlation amplitude. Due to the direct estimation of the correlation amplitude over the Prompt, Very-Early and Very-Late positions, this technique is particularly sensitive to multipath reflections.

Another technique, known as the Double Estimation technique, is described in European Patent EP 2 049 914 B1. This technique implements two tracking loops, a C-DLL (for Code Delay Lock Loop), tracking the PRN code of the BOC signal, and a S-DLL (for Subcarrier Delay Lock Loop), tracking the subcarrier of the BOC signal. The difference between the pseudo ranges estimated within the two loops is used to readjust the measured pseudo-range. As multipath reflections might affect differently the C-DLL and the S-DLL loops, false readjustments of the subcarriers may occur frequently, leading to false pseudo range measurements.

Another technique, known as the Double-Discriminator technique, is described in European Patent EP 2 382 484 B1. This technique involves calculation of two discriminators in parallel, based on the subcarrier and code of the BOC signal. The first discriminator calculation, called a non-ambiguous discriminator calculation, leads to a non-ambiguous determination of a tracking position, unlike the second discriminator calculation, which is ambiguous. However, the second discriminator calculation is more precise and less sensitive to noise and multipath reflections than the first one. A selection unit is configured to compare the value of the first discriminator with a threshold, and to select the discriminator value used in the tracking loop depending on the result of this comparison. Compared to the previous techniques, this technique behaves well in case of false alarms, because it does not create abrupt code phase jumps to readjust the phase of the tracking loop when detecting a tracking position on a side peak. However, because multipath reflections significantly affect the shape of the non-ambiguous discriminator values, they can preclude detection of side peak tracking, which leads to wrong pseudo range measurements.

SUMMARY OF THE INVENTION

It is an object of the invention to provide improvements over prior art by improving robustness of these techniques to cope with multipath propagation environments.

This is achieved by providing a receiver implementing a first loop tracking the subcarrier and code of the BOC signal and calculating an associated pseudo range, and a second loop tracking the code of the BOC signal, demodulated as a BPSK signal, and calculating a second pseudo range. The receiver compares the two calculated pseudo ranges, and adjusts the calculation of the first discriminator used in the code tracking loop accordingly.

To this effect, the invention discloses a GNSS receiver comprising:
- a circuit configured to receive a positioning signal comprising a carrier modulated by a subcarrier and a PRN code,
- a subcarrier and code tracking loop, comprising a first discrimination circuit configured to calculate a first discriminator value from said received positioning signal and a first reference signal, the subcarrier and code tracking loop being configured to calculate a first pseudo range from said first discriminator value,
- a code tracking loop, comprising a second discrimination circuit, configured to calculate a second pseudo range from said received positioning signal and a second reference signal,
- a calculation circuit configured to evaluate a difference between said first pseudo range and said second pseudo range, and to modify computation of the first discriminator value accordingly.

In one embodiment of the GNSS receiver, said first pseudo range, at the output of the subcarrier and code tracking loop, is a non-ambiguous pseudo range.

Advantageously, the first discrimination circuit is further configured to calculate an ambiguous discriminator value and a non-ambiguous discriminator value, the calculation circuit being configured to modify the computation of the first discriminator value by selecting said non-ambiguous discriminator value for a predefined period of time when the absolute value of the evaluated difference is above a threshold, and said ambiguous discriminator value otherwise.

In another embodiment of the invention, the calculation circuit is configured to calculate an ambiguous discriminator value, and to modify the computation of the first discriminator value by adding an offset to said ambiguous discriminator value for a predefined period of time when the absolute value of the evaluated difference is above a threshold.

In another embodiment of the invention, the first discrimination circuit is further configured to calculate an ambiguous discriminator value and a non-ambiguous discriminator value, the calculation circuit being configured to modify the computation of the first discriminator value by selecting said non-ambiguous discriminator value when an absolute value of the evaluated difference is above a first threshold, until the absolute value of the evaluated difference is under a second threshold, and said ambiguous discriminator value otherwise.

Advantageously, the GNSS receiver further comprises a second calculation circuit configured to modify the second pseudo range by smoothing a plurality of successive second pseudo range values. In another embodiment, the second pseudo range is smoothed using the value of the first pseudo range.

In another embodiment of the GNSS receiver, the spectrum of the GNSS positioning signal comprising two lobes, the code tracking loop is configured to calculate the second pseudo range from a single lobe of the GNSS positioning signal. In another embodiment, the code tracking loop being configured to calculate the second pseudo range from both lobes of the GNSS positioning signal.

The invention also discloses a method for calculating a pseudo-range in a GNSS receiver, comprising:
- a first step of receiving a positioning signal comprising a carrier modulated by a subcarrier and a PRN code,
- a second step of calculating a first discriminator value from the received signal in a subcarrier and code tracking loop, and a first pseudo range from said first discriminator,
- a third step of calculating a second discriminator value and a second pseudo range from the received signal in a code tracking loop,
- a fourth step of calculating a difference between said first pseudo range and said second pseudo range,
- a fifth step of modifying the calculation of said first discriminator value depending on said difference.

BRIEF DESCRIPTION OF THE DRAWINGS

The invention will be better understood and its various features and advantages will emerge from the following description of a number of exemplary embodiments and its appended figures in which:

FIGS. 5a and 5b respectively illustrate the behavior of BOC discriminators when operating in a single path and in a multipath environments;

DETAILED DESCRIPTION OF THE INVENTION

Figure 1:
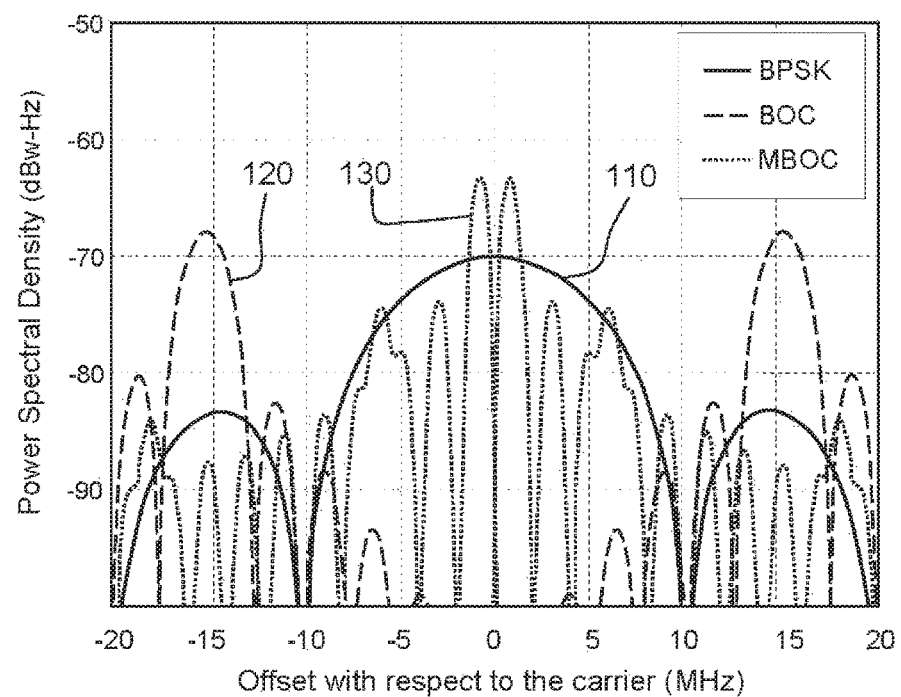
FIG. 1 represents spectrums of a BPSK, a BOC, and a MBOC signal, according to prior art.

FIG. 1 represents spectrums example of a BPSK (110), a BOC (120), and a MBOC (130) signal, according to prior art.

In FIG. 1, spectrums are represented with respect to the carrier frequency. It can be observed that the BPSK spectrum 110 is centered on the carrier frequency.

Generating a BOC signal comprises modulating the carrier of the signal by a code and a subcarrier. BOC modulation is usually described as:

$$x(t) = \sqrt{A} \cdot d(t) \cdot c(t) \cdot s(t) \cdot \exp(j[2\pi f_c t + \theta]),$$

where $\sqrt{A}$ is the complex signal's amplitude, d(t) the data transmitted, c(t) the pseudo-random noise (PRN) code signal, s(t) the subcarrier signal, $f_c$ and $\theta$ the carrier frequency and phase.

As a consequence of the modulation by the subcarrier signal, the BOC spectrum 120 is split in two side bands distributed on either side of the nominal carrier frequency, with a frequency shift equivalent to the subcarrier frequency. Each lobe of the signal can be seen as a BPSK spectrum.

Such BOC signals are used for satellite positioning, the precision being better than BPSK signals, and the cohabitation with other signals using the same carrier frequency being easier, due to the subcarrier modulation.

BOC modulation has several variants, among which the sine BOC, cosine BOC, or Multiplex BOC (MBOC), represented by curve 130. MBOC modulation has been proposed for Galileo and modernized GPS signals, and combines a sine binary offset carrier SinBOC (1, 1) with a SinBOC (m,n). The invention applies identically whatever the BOC variant and the (m, n) set of parameters; the only requirement being that the signal be composed of a carrier wave modulated by a code and a subcarrier, with m≥n.

The BOC signals can be demodulated using the entire signal, including the code and subcarrier components, or considering only one lobe. In the latter case, the subcarrier signal of the BOC signal is suppressed by considering only one lobe of BOC signal, and shifting it by the appropriate frequency to remove the subcarrier contribution. The resulting signal still comprises the code information, and can be demodulated as a classic BPSK signal, with a 3 dB loss of performance due to the processing of only half of the signal power spectrum density.

Figure 2A:
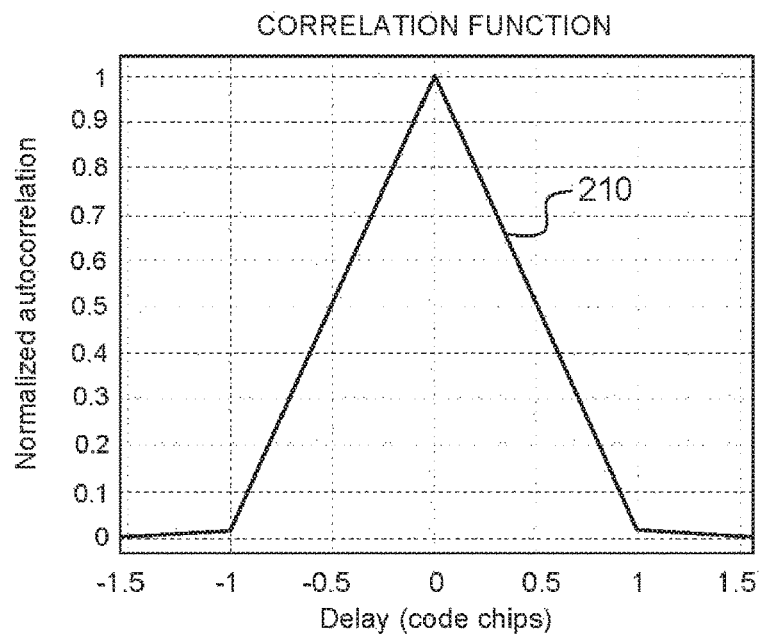
FIGS. 2a and 2b respectively represent examples of autocorrelation functions for a BPSK signal and a BOC signal, according to prior art.
Figure 2B:
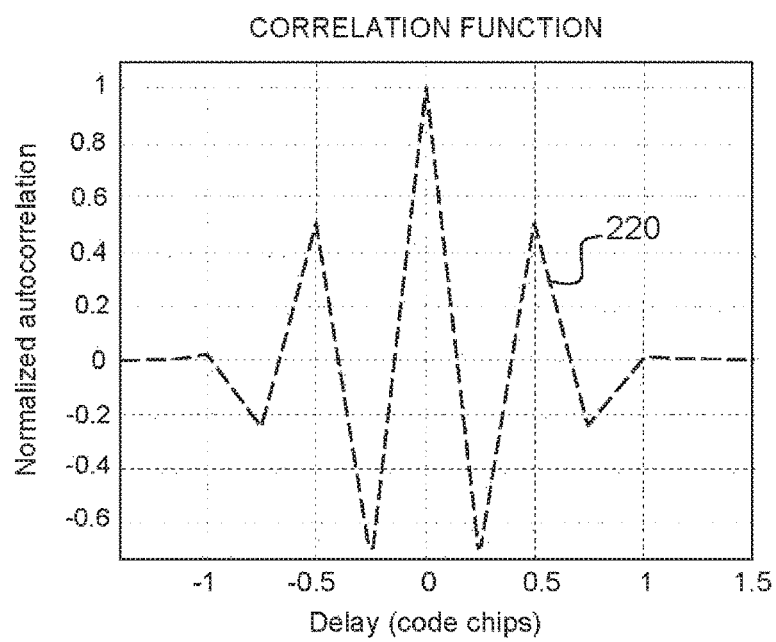

FIGS. 2a and 2b respectively represent examples of autocorrelation functions for a BPSK signal (210) and a BOC signal (220) according to prior art, over a duration of two time chips around the perfect delay. The BPSK signal autocorrelation shows only one peak in this interval. Its maximum represents the perfect synchronization position, and can be determined in a non-ambiguous way. The BOC signal autocorrelation shows multiple peaks. As the main peak of the BOC autocorrelation is sharper than the BPSK signal autocorrelation peak, the tracking precision is better. However, in some circumstances (noisy environment, multiple propagation paths, . . . ) the tracking position can be associated with one of the side peaks, thus resulting in localization errors, which is why the autocorrelation of a BOC signal is known to be ambiguous.

The correlation function is used in the reception chain to build a discriminator value, which is used to sense the synchronization error based on the correlation between the received signal and a reference signal constructed from an internal time reference delivered by a local oscillator, or NCO (Numerically Controlled Oscillator). This discriminator value is used in the receiver chain to detect misalignments between the local and the received code signals. Its value is equal to zero when the tracking position is correct (the local time reference is time synchronized with the received signal), and has a value proportional to the time shift that must be applied to the oscillator to recover from tracking errors.

As the autocorrelation function of a BOC signal is ambiguous, a discriminator calculation constructed from the correlation between a received BOC signal and a reference signal is ambiguous, and a tracking position may be locked on one or other of the side correlation peaks.

Non-ambiguous correlations can be obtained from BOC signals. First, only one lobe of the BOC signal can be considered, and frequency shifted so that the subcarrier information is suppressed. This signal is equivalent to a BPSK signal, so the resulting discriminator value is non-ambiguous. Second, a non-ambiguous discriminator calculation can be obtained considering the envelope of the ambiguous correlation by removing the subcarrier information. This non-ambiguous discriminator calculation, referred in prior-art as a BPSK-like discriminator, is quite similar to the discriminator calculation of the BPSK signal.

Figure 3:
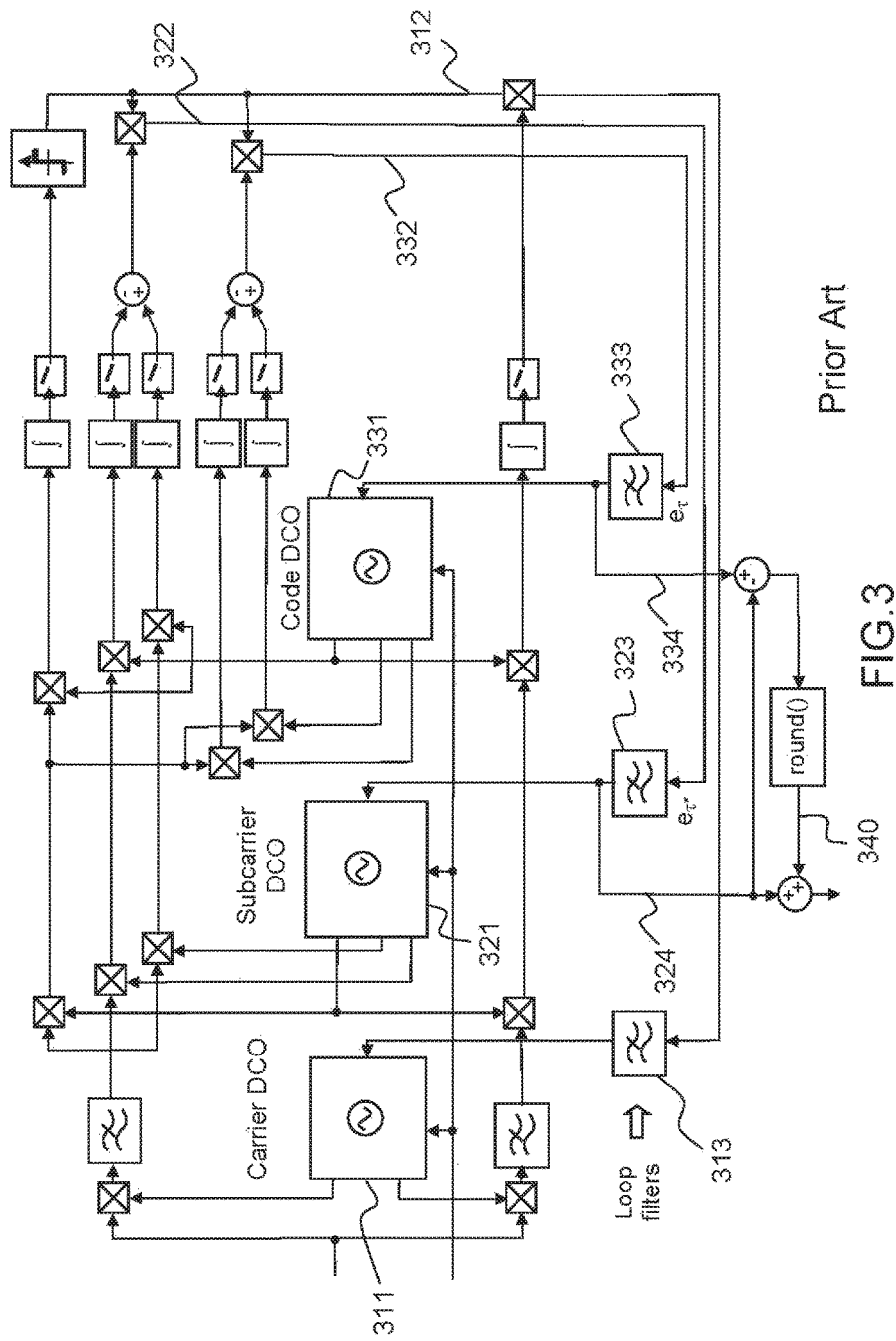
FIG. 3 represents a Double Estimator structure, according to prior art.

FIG. 3 represents a Double Estimator structure, according to prior art, as described in European Patent EP 2 049 914 B1. On FIG. 3 are represented a carrier tracking loop, a subcarrier tracking loop and a code tracking loop. The carrier tracking loop comprises a carrier frequency generator 311, configured to generate in-phase and quadrature reference signals for down-conversion of the received signal from carrier frequency or intermediate frequency to baseband, and determination of the in-phase and quadrature signals. The carrier tracking loop also comprises the calculation of a carrier discriminator value 312 that inputs a carrier loop filter 313 to control the carrier frequency generator. In the following, the carrier tracking loop is not considered, because the invention processes this loop just like a receiver of prior art. The subcarrier tracking loop comprises a subcarrier generator 321, for generating prompt, early and late reference subcarrier signals. These signals are multiplied with the in-phase and quadrature baseband signals, and with code reference signals, in order to calculate an ambiguous discriminator value 322. This ambiguous discriminator value inputs to a subcarrier loop filter 323 that controls the subcarrier generator, and allows calculating a first, ambiguous, pseudo range $e_{T*}$ (324). The code tracking loop comprises a code generator 331, for generating prompt, early and late reference code signals. These signals are multiplied with the in-phase and quadrature baseband signals, and the subcarrier signals, in order to calculate a BPSK-like non-ambiguous discriminator value 332. This non-ambiguous discriminator value inputs a code loop filter 333 that controls the code generator, and allows calculating a second, non-ambiguous, pseudo range $e_T$ (334).

As $e_{T*}$ is more precise than $e_T$, this value is used as an output of the tracking function, but, in order to remove the ambiguity of the measurement, it is compensated by an offset 340 representative of the error measured between $e_{T*}$ and $e_T$. This offset is rounded to a multiple of the distance between two adjacent peaks of the autocorrelation function of the BOC signal, this distance being $\frac{1}{2} \cdot f_s$, with $f_s$ the subcarrier frequency.

When operating in a multipath propagation environment, the subcarrier tracking loop and the code tracking loop of the Double Estimator technique are affected differently. Because, in the Double Estimation technique, the estimated pseudo range is directly compensated from a measured error between a subcarrier and code tracking loop pseudo range and a code tracking loop pseudo range, a wrong measurement performed in any of these tracking loops, due to noise or multipath, has a direct impact on the resulting pseudo range, and leads to a wrong PVT measurement.

Figure 4:
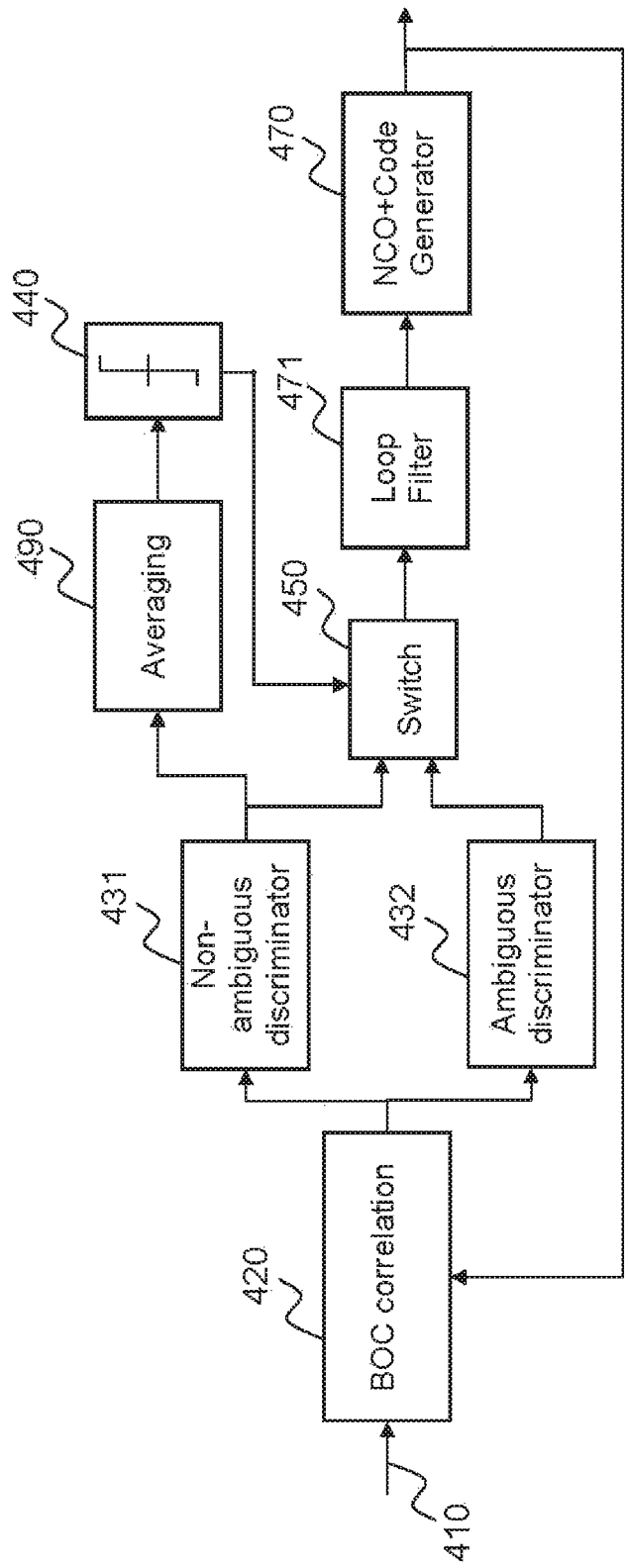
FIG. 4 represents a Double Discriminator Technique structure, according to prior art.

FIG. 4 represents a Double Discriminator Technique structure, according to prior art. In the Double Discriminator technique, there is only one tracking loop, for both the subcarrier and code tracking (the carrier tracking loop is not represented). The received BOC signal 410 is correlated in 420 with a reference signal, and a combination of correlations are used to calculate a non-ambiguous discriminator value 431 and an ambiguous discriminator value 432. As in the Double Estimation technique, these calculations require combining correlations results from the in-phase and quadrature phase carrier signal, considering or not the sub-carrier signal, for prompt, early and late positions. By comparison 440 between the resultant non-ambiguous discriminator value and a threshold, a switch 450 is controlled, in order to select one of the non-ambiguous discriminator calculation and the ambiguous discriminator calculation. The resulting discriminator value is filtered to control the NCO 470, which is used to calculate a non-ambiguous pseudo-range 480.

When the ambiguous discriminator calculation is tracking the main correlation peak, the value of the non-ambiguous discriminator is small. The pseudo-range estimation is therefore calculated from the ambiguous discriminator, and is very precise. But when the ambiguous discriminator calculation is tracking a side correlation peak, the value of the non-ambiguous discriminator increases. When it exceeds a threshold, the switch selects the non-ambiguous discriminator calculation for a predetermined period of time, instead of the ambiguous discriminator calculation. As a result, the precision of the estimated pseudo-range is lower, but the tracking loop, using the non-ambiguous discriminator value, will gradually converge toward the main correlation peak. Once the tracking loop has converged, the ambiguous discriminator calculation is reselected for closing the tracking loop.

In order to increase the robustness of the side peak tracking detection against noise, the value of the non-ambiguous discriminator can be averaged (490) over at least a few measurements.

Unlike the Double Estimation technique, in the Double Discriminator Technique the non-ambiguous discriminator is calculated from the BOC signal, not considering only one lobe of the signal, showing thus better response time to a side peak jump. Moreover, there is no direct correction of a measured error on the pseudo range estimate, but the use of a different discriminator calculation in the tracking loop, the discriminator value being furthermore filtered by the loop filter. A false side peak detection in the Double Discriminator technique will result in an un-necessary switch of the selected discriminator calculation and a temporary deterioration of the range measurement precision due to the BPSK-like tracking, but not to the calculation of a totally wrong pseudo-range.

FIGS. 5a and 5b respectively illustrate the behavior of BOC discriminators in a single path and in a multiple path environment. FIGS. 5a and 5b represent a time duration of about two time chips, centered on the right tracking delay 501 (main correlation peak tracking).

On FIG. 5a is represented a non-ambiguous discriminator 510 in a single path environment. This discriminator is null when the tracking error is null, and its sign and amplitude depend on the tracking error. As this discriminator is non-ambiguous, it only crosses the zero value once in this time interval. On the contrary, the ambiguous discriminator 520 is null when the tracking error is null, but also when the tracking positions match a side peak of the correlation function. What is remarkable is that, when the tracking is performed on a side correlation peak, the ambiguous discriminator value is null, but the non-ambiguous discriminator value exceeds a threshold 530. The Double Discriminator technique uses this property to detect tracking on a side correlation peak.

On FIG. 5b, the same discriminators are represented, in a multipath propagation environment. The robustness of the non-ambiguous discriminator to multipath is comparable to the robustness of a BPSK modulation. The robustness of the ambiguous discriminator, based on the BOC signal, is better. As a result, the non-ambiguous discriminator is more affected by multipath than the ambiguous one. This results in having a non-ambiguous discriminator value which is not null when the tracking error is null, and which may not reach the threshold used in the Double Discriminator technique for detecting tracking on side peaks. Therefore, the structure of the Double Estimator technique, and in particular the comparison of a non-ambiguous discriminator value with a threshold, results in unreliable operation in a multipath environment.

The invention takes advantage from both a Double Estimator like and a Double Discriminator like techniques, to propose a new structure which is robust in a multipath environment, such as for example urban or indoor environments.

Figure 6:
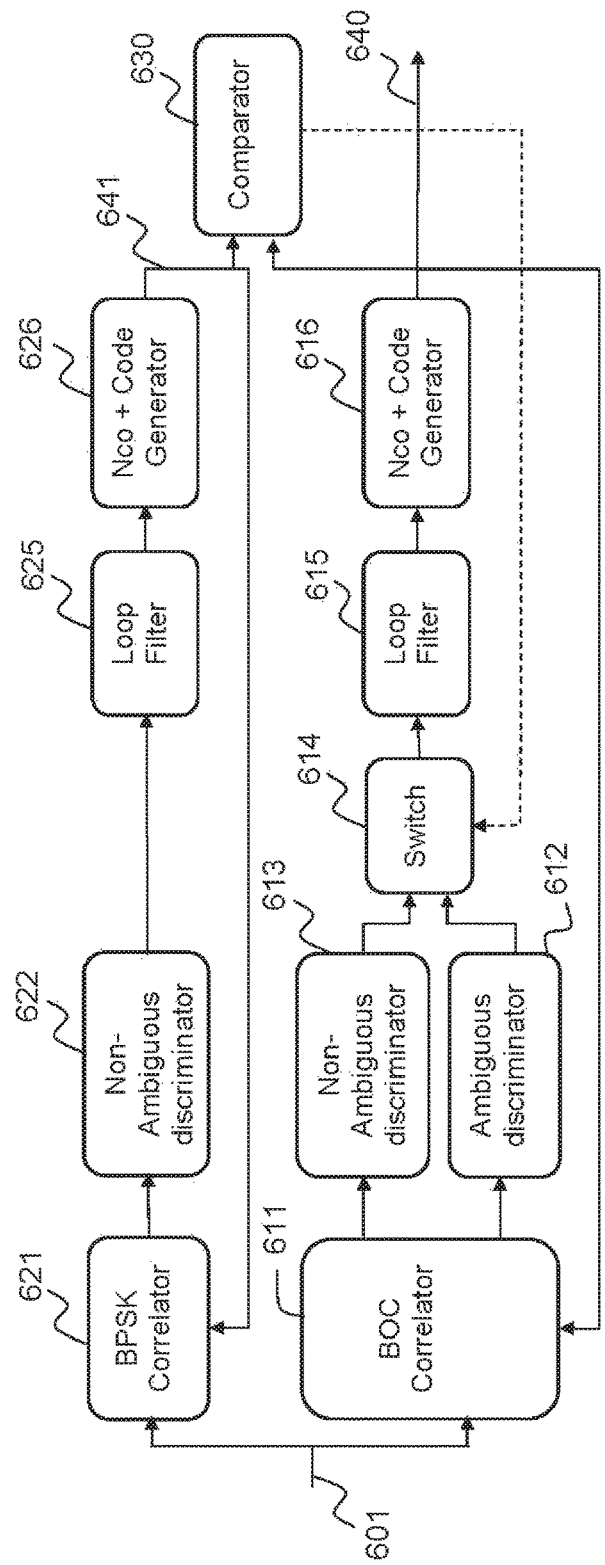
FIG. 6 represents a first embodiment of the invention, wherein the discriminator calculation used to perform the pseudo range measurement is selected from a non-ambiguous and an ambiguous discriminator calculation, depending on the difference between pseudo range values calculated from a subcarrier and code tracking loop and a code tracking loop.

FIG. 6 represents a first embodiment of the invention implemented in a GNSS receiver, wherein the discriminator calculation used to perform the pseudo range measurement is selected from a non-ambiguous and an ambiguous discriminator calculation, depending on the difference between pseudo range values calculated from a code tracking loop and from a subcarrier and code tracking loop. The input 601 of the circuit shown on FIG. 6, is an in-phase and quadrature base band or intermediate frequency BOC positioning signal. The carrier loop, mandatory to generate these signals, is not represented, as its implementation is known from prior art, as described in FIG. 3.

In this embodiment, a first tracking loop comprises some BOC correlators 611, used to determine both an ambiguous discriminator value 612 and a non-ambiguous discriminator value 613, from the received BOC signal and a reference signal. In an exemplary implementation of the embodiment, the BOC correlators use prompt, early and late subcarrier signals and code signals references to calculate the following correlations:

$$EIs = \int r(t) * c\left(t - \frac{\Delta}{2}\right) * s_s\left(\varphi - \frac{\Delta}{2}\right) * \sin(\theta),$$

$$EQs = \int r(t) * c\left(t - \frac{\Delta}{2}\right) * s_s\left(\varphi - \frac{\Delta}{2}\right) * \cos(\theta),$$

$$EIc = \int r(t) * c\left(t - \frac{\Delta}{2}\right) * s_c\left(\varphi - \frac{\Delta}{2}\right) * \sin(\theta),$$

$$EQc = \int r(t) * c\left(t - \frac{\Delta}{2}\right) * s_c\left(\varphi - \frac{\Delta}{2}\right) * \cos(\theta),$$

$$PIs = \int r(t) * c(t) * s_s(\varphi) * \sin(\theta),$$

$$PQs = \int r(t) * c(t) * s_s(\varphi) * \cos(\theta),$$

$$PIc = \int r(t) * c(t) * s_c(\varphi) * \sin(\theta),$$

$$PQc = \int r(t) * c(t) * s_c(\varphi) * \cos(\theta),$$

$$LIs = \int r(t) * c\left(t + \frac{\Delta}{2}\right) * s_s\left(\varphi + \frac{\Delta}{2}\right) * \sin(\theta),$$

$$LQs = \int r(t) * c\left(t + \frac{\Delta}{2}\right) * s_s\left(\varphi + \frac{\Delta}{2}\right) * \cos(\theta),$$

$$LIc = \int r(t) * c\left(t + \frac{\Delta}{2}\right) * s_c\left(\varphi + \frac{\Delta}{2}\right) * \sin(\theta),$$

$$LQc = \int r(t) * c\left(t + \frac{\Delta}{2}\right) * s_c\left(\varphi + \frac{\Delta}{2}\right) * \cos(\theta),$$

where:
  Exx represents an early correlation,
  Pxx represents a prompt correlation,
  Lxx represents a late correlation,
  xIx represents a correlation using the in-phase carrier input signal,
  xQx represents a correlation using the quadrature carrier input signal,
  xxs represents a correlation using the in-phase subcarrier signal,
  xxc represents a correlation using the quadrature subcarrier signal,
  r(t) is the input signal on carrier frequency, on intermediate frequency or baseband,
  c(t) is the code reference signal,
  $s_s(t)$ is the in-phase subcarrier reference signal,
  $s_c(t)$ is the quadrature subcarrier reference signal,
  θ is the carrier phase,
  φ is the subcarrier phase, equivalent to the code phase, but formulated in subcarrier periods,
  Δ is the spacing between the early and late positions.

An ambiguous discriminator value can be determined calculating:

$$E^2 = EIs^2 + EQs^2$$
$$L^2 = LIs^2 + LQs^2$$
$$D_A = \frac{2-\Delta}{2}(E^2 - L^2)/(E^2 + L^2),$$

where $D_A$ is the ambiguous discriminator value.

A non-ambiguous discriminator value (BPSK-like) can be determined calculating:

$$E^2 = EIs^2 + EQs^2 + EIc^2 + EQc^2$$
$$L^2 = LIs^2 + LQs^2 + LIc^2 + LQc^2$$
$$D_{NA} = \frac{2-\Delta}{2}(E^2 - L^2)/(E^2 + L^2),$$

where $D_{NA}$ is the non-ambiguous discriminator value.

Many different methods are known from the one skilled in the art of positioning techniques, to determine ambiguous and non-ambiguous discriminator values from a BOC signal. Some of these techniques are described in European Patent EP 2 049 914 B1. The invention applies identically with all these different methods.

Back to FIG. 6, a switch 614 selects one of the non-ambiguous and the ambiguous discriminator calculation, the output of the switch being a first discriminator value. A loop filter 615 filters some of the noise of this discriminator value, and generates a control signal for adjusting a NCO 616. The phase of the NCO is associated to the information transported in the received message, to determine a first pseudo range. The phase of the NCO 616 is also used to generate the subcarrier and code reference signals used by the BOC correlators.

In FIG. 6, a second tracking loop, only considering the code of the signal by selecting one lobe of the BOC signal and removing the subcarrier signal, comprises a BPSK correlator 621, used to calculate a second, non-ambiguous, discriminator value 622. A loop filter 625 filters some of the noise of the non-ambiguous discriminator value, and generates a control signal in charge of adjusting a NCO 626. The phase of the NCO is associated to the information transported in the received message to determine a second, non-ambiguous, pseudo range. The phase of the NCO 626 is also used to generate the code reference signal used by the BPSK correlator.

A comparator 630 takes as input the first and second pseudo ranges, and compares the absolute value of the difference between the two pseudo ranges and a threshold. When the absolute value of the difference is above the threshold, the switch 614 is commanded to select the non-ambiguous discriminator calculation for a predefined period of time. When this period of time is over, the switch selects back the ambiguous discriminator calculation for a more accurate tracking.

On start, just after the satellite acquisition phase, the switch 614 is configured to select the non-ambiguous discriminator calculation (BPSK-like), for a predefined period of time. The duration of this period of time depends on the loop equivalent bandwidth. A typical value is $x/B_n$, where $1 \leq x \leq 5$, and $B_n$ the equivalent noise bandwidth of the tracking loop. During this time period, the pseudo range measurement 640 is non-ambiguous, and the NCO converges toward the right tracking position. When the time period is elapsed, the switch selects the ambiguous discriminator calculation, which is more accurate. As the tracking loop is locked on the main peak of the autocorrelation function of the BOC signal, the calculated pseudo range is non-ambiguous. If the NCO drifts toward a side peak, because of noise or multiple propagation paths, the error, measured in 630, between the calculated pseudo range and the second pseudo range calculated by the code tracking loop increases. When it reaches a threshold, the switch 614 selects the non-ambiguous discriminator calculation for a limited period of time. As a result, the pseudo range measurement 640 is always non-ambiguous, whatever the discriminator calculation selected in the subcarrier and code tracking loop.

Such an implementation is less sensitive to multiple paths than the Double Discriminator Technique. Indeed, multiple paths distort the output of the discriminators calculations more than they shift the zero position of the discriminators. As a result, the proposed solution, selecting a discriminator calculation according to the value of a difference between calculated pseudo ranges and not according to the value of discriminators, is less sensitive to multipath reflections. This is even more pronounced in presence of noise, the switch selection being performed after the loop filter.

Such an implementation is also less sensitive to measurement errors than the Double Estimator technique, as the result of the comparison between the two pseudo ranges is not directly used to apply a shift to the NCO value, which could lead to a resynchronization on a side peak, but is used to control selection of a discriminator calculation that might result in a precision decrease, but not an inaccurate measurement.

In order to reduce the power consumption of the GNSS receiver, when the non-ambiguous discriminator calculation 613 is selected, as this selection is valid for a predefined period of time, the code tracking loop (621, 622, 625 and 626), the comparator 630 and the calculation of the ambiguous discriminator 612, can be stopped.

When the ambiguous discriminator calculation 612 is selected, the calculation of the non-ambiguous discriminator 613 can also be stopped, as well as the part of the BOC correlators in charge of correlations with the quadrature subcarrier phase signal, only required to calculate the non-ambiguous discriminator.

In this embodiment, the GNSS receiver comprises:
- a subcarrier and code tracking loop, comprising a first discrimination circuit (611, 612 and 613), calculating a first pseudo range 640 from the received signal 601 and a first reference signal generated by the code generator 616,
- a code tracking loop, comprising a second discrimination circuit (621 and 622), calculating a second pseudo range 641 from the received signal 601 and a second reference signal generated by the code generator 626,
- a calculation circuit 630 configured to evaluate a difference between said first and second pseudo range, and to modify the output of the first discrimination circuit 614 accordingly.

A second independent tracking loop is needed to control the discriminator calculation selection of the first tracking loop. In the embodiment, the second tracking loop is based on a BPSK correlator. In another embodiment, not shown on the figures, a non-ambiguous discriminator calculation based on a BOC signal, as for example the BPSK-like discriminator calculation 613, could be used as input of the loop filter 625 to control the NCO and code generator 626. However, the output of the non-ambiguous discriminator calculation, based on the BOC signal, is more sensitive to noise than the output of a non-ambiguous discriminator calculation based on a correlation on a BPSK signal. It is therefore recommended to use a BPSK correlator.

In an embodiment, the lobe of the BOC signal used to perform the BPSK correlation is the lower lobe. In another embodiment, it is the upper lobe, or a successive selection of the lower and upper lobes. In another embodiment, the correlation function used to build the non-ambiguous discriminator value 622 performs correlation measurements on both lobes, the results of the correlations being combined.

Figure 7:
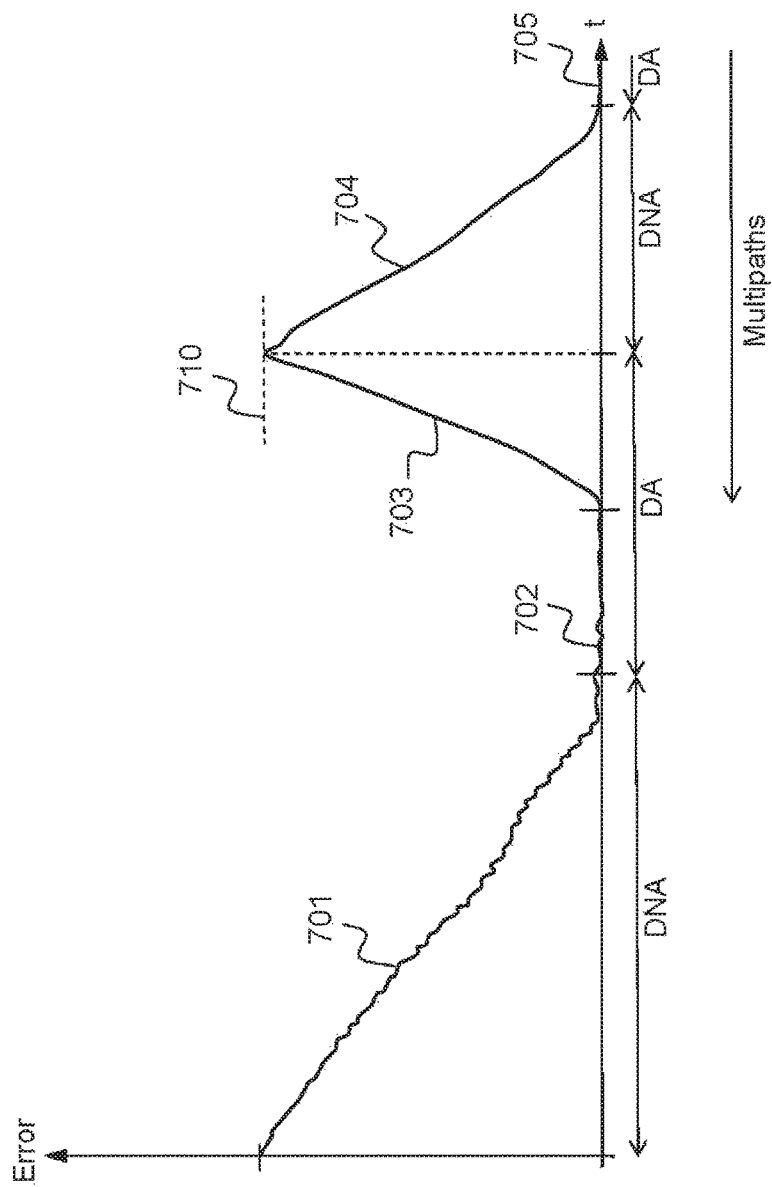
FIG. 7 represents an example of result achieved by the invention.

FIG. 7 represents an example of result achieved by the invention. FIG. 7 represents the tracking position error, and its evolution on the time axis.

During a first phase 701 of the process, a non-ambiguous discriminator calculation is selected to control the subcarrier and code tracking loop. The tracking error will slowly decrease toward the exact position, but the precision of the position is not perfect. In a second phase 702 of the process, the ambiguous discriminator calculation is selected, so that the precision of the tracking is increased. In a third phase 703, multiple paths occur, resulting in a drift of the subcarrier and code tracking loop toward a side peak. The error increases up to point 710 where the comparator will select the non-ambiguous discriminator calculation. In the next phase 704, due to the use of a non-ambiguous discriminator calculation, the tracking loop will return to the main peak position, and the ambiguous discriminator calculation will be selected again.

In another embodiment, not shown, the switch from the ambiguous discriminator calculation to the non-ambiguous discriminator calculation, in the subcarrier and code tracking loop, is performed when the absolute value of the difference measured between the pseudo range calculated from this tracking loop and the pseudo range calculated from the BPSK tracking loop exceeds a first threshold. The non-ambiguous discriminator calculation is selected until the absolute value of the difference goes under a second threshold, below or equal to the first threshold.

Figure 8:
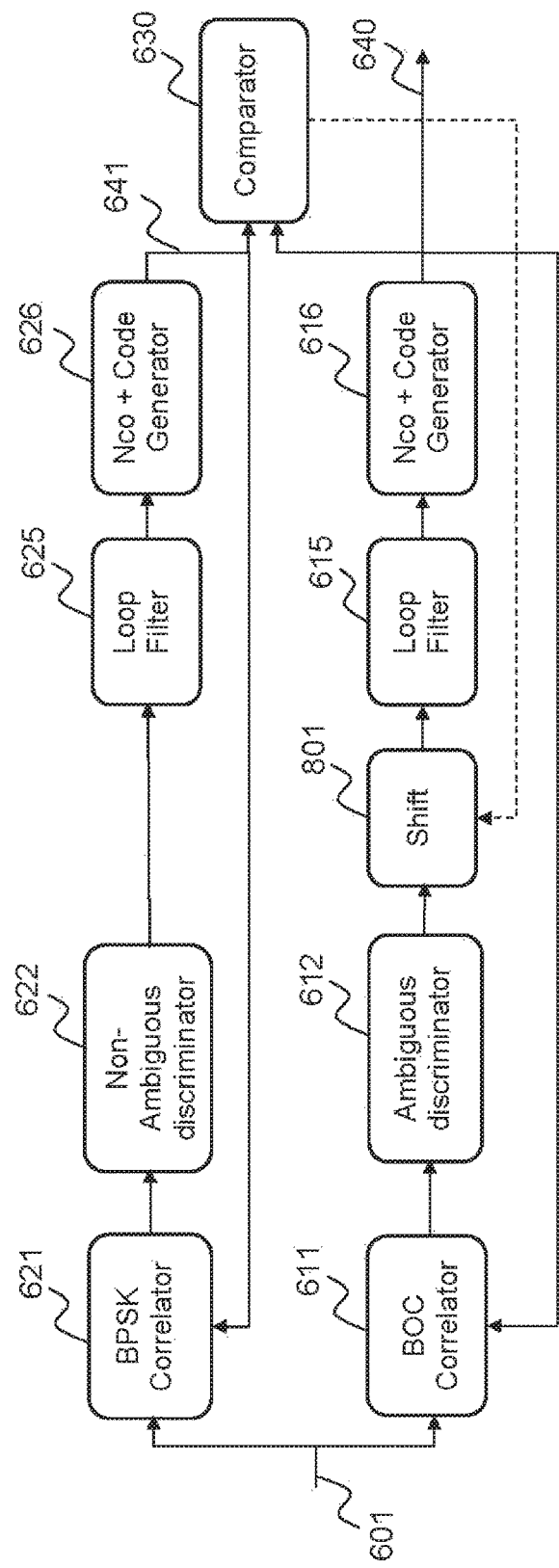
FIG. 8 represents another embodiment of the invention, wherein the discriminator calculation used to perform the pseudo range measurement is corrected of a value depending on the difference between pseudo range values calculated from a subcarrier and code tracking loop and a code tracking loop.

FIG. 8 represents another embodiment of the invention, wherein the discriminator value used to perform the pseudo range measurement is corrected by a value depending on the difference between pseudo range values calculated from a code tracking loop and from a subcarrier and code tracking loop.

FIG. 8 contains the same elements as FIG. 6, except for the non-ambiguous discriminator calculation 613 of the subcarrier and code tracking loop, and the switch 614. In FIG. 8, the first discriminator value used by the subcarrier and code tracking loop is systematically an ambiguous discriminator value. When the comparator 630 measures a difference between a pseudo range 640 determined by the subcarrier and code tracking loop, and a pseudo range 641 determined by the code tracking loop, an offset is added to the value of the ambiguous discriminator 612 for a predefined period of time, in order to bring the tracking position back to the main correlation peak.

The value of the offset and its duration depend on the parameters of the loop filter 615. As the offset addition prevents tracking a side correlation peak, the resulting calculated pseudo range 640 is precise and non-ambiguous.

Figure 9:
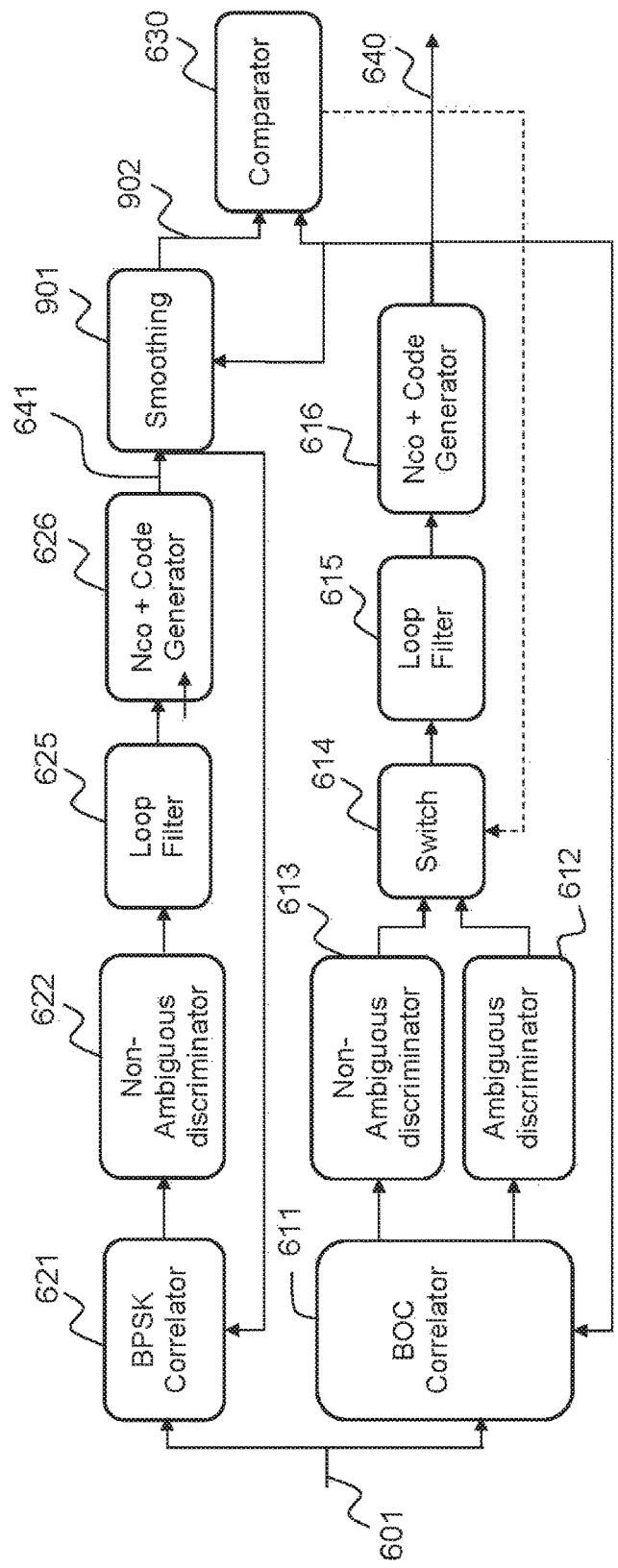
FIG. 9 represents another embodiment of the invention, furthermore comprising a logic to filter the pseudo range measurement calculated from the code tracking loop.

FIG. 9 represents another embodiment of the invention, furthermore comprising logic to filter the pseudo range measurement calculated from the code tracking loop.

FIG. 9 contains the same elements as FIG. 6, plus an additional circuit 901 used to perform a smoothing of the pseudo range value calculated by the code tracking loop. The aim of this circuit is to smooth the value of the pseudo range 641 used by the comparator 630, to further increase the robustness of this measurement to noise and multipath.

This smoothing is performed filtering a set of successive pseudo range values.

In another embodiment, the smoothing is performed using successive second pseudo range 641 values and successive first pseudo range 640 values calculated from the subcarrier and code tracking loop. Smoothing the BPSK pseudo range by the BOC pseudo range can be done, for example, using a Hatch filter, with:

$$\tilde{\rho}(k) = \frac{N-1}{N}(\tilde{\rho}(k-1) + \varphi(k) - \varphi(k-1)) + \frac{1}{N}\rho(k),$$

where:
N is a smoothing time constant, in number of epochs,
k is the time epoch of the actual measurement,
φ is the BOC pseudo range measurement,
ρ is the BPSK pseudo range measurement,
ρ̃ is the smoothed BPSK pseudo range measurement.

The smoothing time constant N starts at 1 and increases until it reaches a final value, in order to guaranty a fast converging of the smoothing algorithm.

Generally, the BPSK pseudo range 641 and the BOC pseudo range 640, acquired from a same satellite, are coherent in speed. As the BOC pseudo range is more accurate than the BPSK pseudo range, smoothing this latter measurement by the former pseudo range measurement helps reducing the noise to a level close to the noise level of the BOC pseudo range measurement.

The invention can be implemented in a GNSS receiver on any appropriate architecture. It applies to a GNSS positioning signal at the output of a RF chain, preferably but not restricted to in baseband or intermediate frequency. The various tracking loops and calculation circuits can be implemented using analog components. If the input signal is digitized, they can also be implemented on a calculation machine as for example a software reprogrammable calculation machine (as for example a microprocessor, a microcontroller, or a digital signal processor (DSP)) or a dedicated calculation machine (as for example a Field Programmable Gate Array (FPGA), or an Application Specific Integrated Circuit (ASIC)). Any intermediate combination of analog and digital components is possible.

Figure 10:
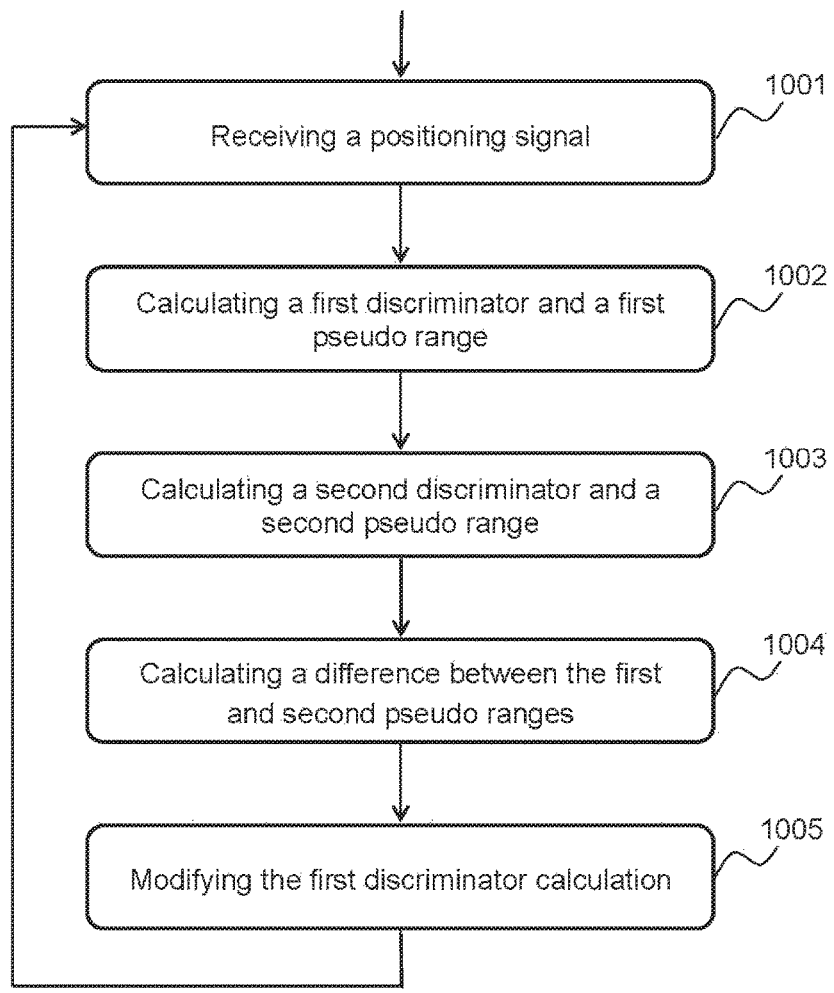
FIG. 10 represents a flow chart of a method according to the invention.

The invention further comprises a method for calculating a pseudo-range in a GNSS receiver, illustrated by the flow chart in FIG. 10. The method comprises:

a first step 1001 of receiving a positioning signal comprising a carrier modulated by a subcarrier and a PRN code, the in-phase and quadrature phase carrier components of the positioning signal being received at this step, a second step 1002 of calculating a first discriminator value and a first pseudo range, associated to an oscillator controlled by a loop filter using the first discriminator value, from the received signal in a subcarrier and code tracking loop, wherein the output of the first discriminator calculation depends on inputs from the latter steps, a third step 1003 of calculating a second discriminator and a second pseudo range, associated to an oscillator controlled by a loop filter using the second discriminator value, from the received signal in a code tracking loop, wherein preferably, the code tracking loop processes the input signal without the subcarrier information, a fourth step 1004 of calculating a difference between said first pseudo range and said second pseudo range, and a fifth step 1005 of modifying the output of said first discriminator calculation depending on said difference. The absolute value of the calculated difference is compared to a threshold, and the output of the first discriminator calculation of the second step is modified accordingly. Depending on the embodiment, this modification can be an offset added to an ambiguous discriminator calculation, or the selection of a non-ambiguous discriminator calculation instead of an ambiguous discriminator calculation. This modification can last for a predetermined period of time, or until the absolute value of the calculated difference is under a second threshold.

In an exemplary embodiment of the method, a non-ambiguous or an ambiguous discriminator value are calculated during the second step, according to the equations described.

The examples disclosed in this specification are only illustrative of some embodiments of the invention. They do not in any manner limit the scope of said invention which is defined by the appended claims.

The invention claimed is:

1. A GNSS receiver comprising:
a circuit configured to receive a positioning signal comprising a carrier modulated by a subcarrier and a PRN code,
a subcarrier and code tracking loop, comprising a first discrimination circuit configured to calculate a first discriminator value from said received positioning signal and a first reference signal using at least calculation of an ambiguous discriminator value, the subcarrier and code tracking loop being configured to calculate a first pseudo range from said first discriminator value,
a code tracking loop, comprising a second discrimination circuit, configured to calculate a second non-ambiguous discriminator value from said received positioning signal and a second reference signal, the code tracking loop being configured to calculate a second pseudo-range from said second non-ambiguous discriminator value,
a calculation circuit configured to calculate a difference between said first pseudo range and said second pseudo range, and to modify the computation of the first discriminator value accordingly.

2. The receiver of claim 1, wherein said first pseudo range, at the output of the subcarrier and code tracking loop, is a non-ambiguous pseudo range.

3. The receiver of claim 1, wherein the first discrimination circuit is configured to calculate an ambiguous discriminator value and a non-ambiguous discriminator value, the calculation circuit being configured to modify the computation of the first discriminator value by selecting said non-ambiguous discriminator value for a predefined period of time when an absolute value of the calculated difference is above a threshold, and said an ambiguous discriminator value otherwise.

4. The receiver of claim 1, wherein the calculation circuit is configured to calculate an ambiguous discriminator value, and to modify the computation of the first discriminator value by adding an offset to said ambiguous discriminator value for a predefined period of time when the absolute value of the calculated difference is above a threshold.

5. The receiver of claim 1, wherein the first discrimination circuit is further configured to calculate an ambiguous discriminator value and a non-ambiguous discriminator value, the calculation circuit being configured to modify the computation of the first discriminator value by selecting said non-ambiguous discriminator value when an absolute value of the calculated difference is above a first threshold, until the absolute value of the calculated difference is under a second threshold, and said ambiguous discriminator value otherwise.

6. The receiver of claim 1, further comprising a second calculation circuit configured to modify the second pseudo range by smoothing a plurality of successive second pseudo range values.

7. The receiver of claim 6, wherein the second pseudo range is smoothed using the value of the first pseudo range.

8. The receiver of claim 1, wherein the spectrum of the GNSS positioning signal comprises two lobes, the code tracking loop being configured to calculate the second pseudo range from a single lobe of the GNSS positioning signal.

9. The receiver of claim 1, wherein the spectrum of the GNSS positioning signal comprises two lobes, the code tracking loop being configured to calculate the second pseudo range from both lobes of the GNSS positioning signal.

10. A method for calculating a pseudo-range in a GNSS receiver, comprising:
a first step of receiving a positioning signal comprising a carrier modulated by a subcarrier and a PRN code,
a second step of calculating a first discriminator value from the received signal and a first reference signal in a subcarrier and code tracking loop, said calculating comprising at least calculation of an ambiguous discriminator value, and a first pseudo range from said first discriminator value,
a third step of calculating a second non-ambiguous discriminator value from the received signal and a second reference signal, and a second pseudo range from the said second non-ambiguous discriminator value in a code tracking loop, a fourth step of calculating a difference between said first pseudo range and said second pseudo range, a fifth step of modifying the calculation of said first discriminator value depending on said difference.

* * * * *